United States Patent [19]
Debeau et al.

[11] Patent Number: 6,160,626
[45] Date of Patent: Dec. 12, 2000

[54] PROCESS AND DEVICE FOR MEASURING THE COMPLEX SPECTRUM (AMPLITUDE AND PHASE) OF OPTICAL PULSES

[75] Inventors: Jean Debeau, Lannion; Rémi Boittin, Ploulec'h, both of France

[73] Assignee: France Telecom, Paris, France

[21] Appl. No.: 09/248,311

[22] Filed: Feb. 11, 1999

[30] Foreign Application Priority Data

Feb. 12, 1998 [FR] France ................................. 98 01694

[51] Int. Cl.$^7$ ................................. G01B 9/02; G01J 3/45
[52] U.S. Cl. ................................................................ 356/451
[58] Field of Search ................................. 356/346, 345

[56] References Cited

U.S. PATENT DOCUMENTS

| | | | |
|---|---|---|---|
| 4,792,230 | 12/1988 | Naganuma et al. | 356/345 |
| 4,941,747 | 7/1990 | Dakin | 356/346 |
| 5,754,292 | 5/1998 | Kane et al. | 356/345 |
| 5,909,659 | 6/1999 | Fujita | 702/189 |

FOREIGN PATENT DOCUMENTS 195 49 303  1/1997  Germany .

OTHER PUBLICATIONS

T. Tomaru, et al., Appl. Phys. Lett., vol. 69, No. 26, pp. 3978–3980, "Linear Measurement of Weak 1.57 μm Optical Pulse Train By Heterodyne Autocorrelation", Dec. 23, 1996.

B.S. Prade, et al., Optics Communications, vol. 113, No. 1/3, pps. 79–84, "A Simple Method for the Determination of the Intensity and Phase of Ultrashort Optical Pulses", Dec. 15, 1994.

R.A. Linke, IEEE Journal of Quantum Electronics, vol. QE–21, No. 6, pps. 593–597, "Modulation Induced Transient Chirping In Single Frequency Lasers", Jun., 1985.

J.L.A. Chilla, et al., Optics Letters, vol. 16, No. 1, pps. 39–41, "Direct Determination of the Amplitude and the Phase of Femtosecond Light Pulses", Jan. 1, 1991.

D.J. Kane, et al. IEEE Journal of Quantum Electronics, vol. 29, No. 2, pps. 571–579, "Characterization of Arbitrary Femtosecond Pulses Using Frequency–Resolved Optical Gating", Feb., 1993.

*Primary Examiner*—Frank G. Font
*Assistant Examiner*—Phil Natividad
*Attorney, Agent, or Firm*—Oblon, Spivak, McClelland, Maier & Neustadt, P.C.

[57] ABSTRACT

A method and apparatus for determining a phase relation of a signal in which a spectrum thereof includes a spectral component at a central optical frequency $f_0$ and frequency spikes $f_n = f_0 \pm nF$, where n is an integer. The apparatus includes device (29, 26, 28, 30 and 32) for producing signals representative of phase differences between two frequency spikes for each pair of adjacent frequency spikes of the frequency spikes $f_n$.

21 Claims, 5 Drawing Sheets

PROCESS AND DEVICE FOR MEASURING THE COMPLEX SPECTRUM (AMPLITUDE AND PHASE) OF OPTICAL PULSES

TECHNICAL DOMAIN AND PRIOR ART

The purpose of this invention is a process for measuring the complex spectrum of optical pulses and a device embodying this process. It is used in applications in which there is a need for detailed characterization of optical pulses. In particular, one industrial application is the detailed characterization of an optical emitter in digital transmissions using optical fibers. This characterization is particularly important when the product of the (digital flow)$^2$ and the range is high. The parasite optical phase modulation associated with the intensity modulation (chirp) has an influence on the propagation of the optical fiber. This is particularly true for transmissions that use an RZ (return to zero) type modulation, making use of a soliton or pseudo-soliton type propagation.

DISCUSSION OF THE BACKGROUND

Optical pulses used in telecommunications through optical fibers have a spectrum that covers a frequency band which is very narrow (a few GHz) compared with the optical carrier (200 THz). They are usually described by their time profile, in other words by the photodetected signal, and are approximately characterized by their width at mid-height. But, when calculating the deformation caused by their propagation in optical fibers (chromatic dispersion, Kerr effect), it is also important to know the variation in the optical frequency (in other words the optical phase distortion) during the pulse (chirp). This variation is characterized approximately by measuring the product $p=\Delta t \times \Delta f$, where $\Delta t$=width of the photodetected pulse at mid-height and $\Delta f$=width of the optical spectrum at mid-height. This product p is minimum when the chirp is zero (constant optical frequency along the pulse), but this minimum is variable depending on the profile of the pulse.

In summary, the signal output by an optical emitter is a narrow band signal that is described by its complex envelope v(t), or by its complex optical spectrum V(f).

The easiest way of measuring optical pulses (modulus of v(t)) is to use a photodiode followed by a sampling oscilloscope. This is true for pulses wider than 20 ps, since the pulse response of the photodiode-oscilloscope pair is not less than 15 ps. The technique used for finer pulses consists of measuring the product or self-correlation function. But this only gives an estimate of the pulse width, since an assumption has to be made about the shape of the pulses.

The measurement of the phase v(t) is much more difficult. Several different methods are given in the literature, usually based on the principle of measuring the spectrum resolved in time.

FIG. 1 diagrammatically shows the principle described in the article by R. A. Linke et al. entitled "Modulation Induced Transient Chirping in Single Frequency Lasers", which was published in the IEEE Journal of Quantum Electronics, vol. QE 21, p. 593–597, 1985. Optical pulses are generated by an optical pulse generator 2. The pulses are filtered by a tunable filter 4 and are detected by a wide band photoreceiver 6, which produces signals sent on a sampling oscilloscope 8. A variable delay 10 triggers the time base of the oscilloscope 8. This method is limited to relatively wide pulses (wider than 30 ps), this limitation being imposed by the photoreceiver response time.

References in FIGS. 2 and 3 that are identical to or correspond to references in FIG. 1 denote the corresponding elements.

FIG. 2 shows the principle of the device described in the article by J. L. A. Chilla et al., entitled "Direct determination of the amplitude and the phase of femtosecond light pulses", Optics Letters, vol. 16, No. 1, pp. 39–41, 1991.

The filter 4 is a diffraction grating made tunable by moving a mirror. An optical gate 12 is controlled by the pulse to be measured and samples the filtered pulse. This gate inter-correlates the filtered pulse with the pulse to be measured. It is performed conventionally by generating the second harmonic of the optical frequency of the pulse to be measured, in a non-linear element. Reference 14 denotes a low frequency photoreceiver.

FIG. 3, also very schematically, shows the principle of the device described in the article by D. J. Kane et al., entitled "Characterization of Arbitrary Femtosecond Pulses Using Frequency-Resolved Optical Grating", IEEE Journal of Quantum Electronics, vol. QE-29, pp. 571–579, 1993.

An optical gate 12 is controlled by the pulse to be measured and samples the same pulse. In this case, the tunable optical filter 4 filters a sample of the pulse to be measured. As in the previous article, the "optical gate" function is obtained by generating the second harmonic in a non-linear element, in the same way as is done conventionally in an optical self-correlator.

In the techniques described above, the optical pulse to be measured is sampled in the frequency domain by a tunable filter (grating, spectrometer, spectrum analyzer), and then in the time domain (photodiode+ sampling oscilloscope or self-correlation product or inter-correlation product) or vice versa. The filter must be narrow if high resolution is required in the frequency domain. But in this case the pulse is wider. This results in poor resolution in the time domain. Since the time and frequency are two inverse magnitudes, it is impossible to precisely measure the instantaneous frequency variation along the pulse using the spectrum resolved in time method as described in the articles mentioned above. Typically, the measurement precision is estimated at $1/\Delta t$ ($\Delta t$=pulse width at mid-height).

The other disadvantages of these methods are as follows:
- the propagation time of the tunable filter must be independent of the frequency, with a precision of less than about 1 fs; this is very difficult to achieve and this is why calibration is necessary, although the calibration is also difficult to implement,
- the optical pulse measurement requires double sampling (one in the frequency domain, and one in the time domain), causing energy dispersal and making high energy pulses necessary. This is even more true when the method uses non-linear effects, as in the articles by Chilla et al. and Kane et al. mentioned above,
- in the articles by Chilla et al. and Kane et al. described above, a search is made for the complex envelope v(t) that gives the best fit to the measurements. The solution found is not necessarily unique.

Another method of measuring the complex envelope is described in the article by B. S. Prade et al. entitled "A Simple method for the determination of the intensity and phase of ultrashort optical pulse", Optics Communications, pp. 79–84, 1994. The principle of this method consists of comparing the intensity spectrum of the pulse to be measured with the spectrum obtained after transmission in an optical fiber. These two spectra are different due to non-linear effects in the fiber (Kerr effect). A search is then made for a complex envelope v(t) which, by calculation, corresponds to these two spectra. But the solution is firstly not unique, and secondly is very sensitive to the measurement precision. It is very unusual to find the correct result, so that this method is unusable.

SUMMARY OF THE INVENTION

The invention relates to a device for determining the phase relation between a signal in which the spectrum comprises a spectral component with a central optical frequency $f_0$ and frequency spikes $f_n=f_0\pm nf$, where n is an integer, comprising means of producing signals representative of the phase differences between the two spikes in each pair of adjacent spikes.

With this device, a direct search can be made for the signal phase relation, and there is no need to take a double (time and spectral) sample of the signal. Furthermore, this device does not involve the use of non-linear effects. Finally, it is no longer necessary to search for an envelope that gives the best fit with the measurements.

The phase is measured directly, whereas the phase is found in the methods used most frequently at the present time. In other words, known methods involve a search for a function that represents the phase as a function of the optical frequency that matches the measurements, which is the reason for inaccuracy in the results and particularly risks of an ambiguity.

Means may also be provided for producing a signal representative of the phase of each spike starting from signals representative of the phase differences in each pair of adjacent spikes.

According to one particular embodiment, the means for producing signals representative of the phase differences between two spikes $f_n$ and $f_{n+1}$ comprise:

means of converting the two spikes $f_n$ and $f_{n+1}$, into two spikes with the same frequency: $f_n+0.5F$ and means of producing a signal representative of the phase of an interference signal between the two spikes with frequency $f_n+0.5F$.

Thus, the measured signal does not interfere with the initial signal.

For example, the initial signal is modulated with a signal with frequency F/2, and the phase of the signal with frequency F/2 is shifted with respect to the signal for which the spectrum is to be measured.

According to the invention, the optical pulse to be measured is modulated, preferably sinusoidally and in synchronism with this pulse to be measured. The optical phase of the pulse can be determined by varying the synchronization time $\tau$ (or the phase difference between the signal with frequency F/2 and the signal for which the spectrum is to be measured).

According to one variant, means of producing signals representative of the phase differences between two spikes $f_n$ and $f_{n+1}$ comprise means of converting the two spikes $f_n$ and $f_{n+1}$ into two spikes with frequency $f_n+0.5F\pm\Delta F$, where $\Delta F/F<<1$ (for example $\Delta F/F$ less than $10^{-2}$ or $10^{-3}$ or $10^{-4}$) and means of producing a signal representative of the intensity at frequency $f_n+0.5F$.

According to another variant, the means of producing signals representative of the phase differences between two spikes $f_n$ and $f_{n+1}$ comprise means of converting each spike $f_n$ into two spikes at frequencies $f_n-F$ and $f_n+F$ and to produce a signal representing the phase of an interference signal between spikes with frequency $f_n$.

The measurement of the complex spectrum, which is another purpose of this invention, is also a precise and particularly reliable measurement, since it does not require any calibration. This measurement method can be used as a reference method.

Another purpose of the invention is a device for determining the phase relation of an optical signal with a continuous spectrum comprising means of producing signals representative of the phase difference between the signal at frequency $f_n-F/2$ and the signal at frequency $f_n+F/2$, for n sampling frequencies $f_n$. The frequency F is the spectrum sampling frequency.

Means may be provided to produce a signal representative of the signal phase for each frequency $f_n=f_0\pm nF$, where $f_0=$ the central frequency of the spectrum, starting from signals representative of the phase differences.

This device has the same advantages as the device described above compared with a discrete spectrum.

BRIEF DESCRIPTION OF THE DRAWINGS

In any case, the characteristics and advantages of the invention will be clearer after reading the following description. This description applies to example embodiments given for explanatory and non-restrictive purposes, with reference to the attached drawings in which.

DESCRIPTION OF THE PREFERRED EMBODIMENTS

Figure 1:
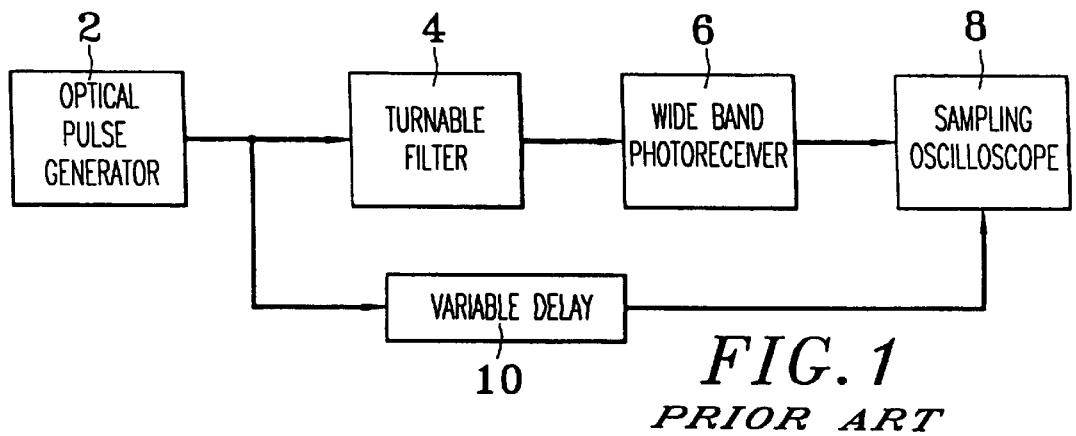
FIGS. 1 to 3 diagrammatically show the various devices and processes according to prior art.
Figure 2:
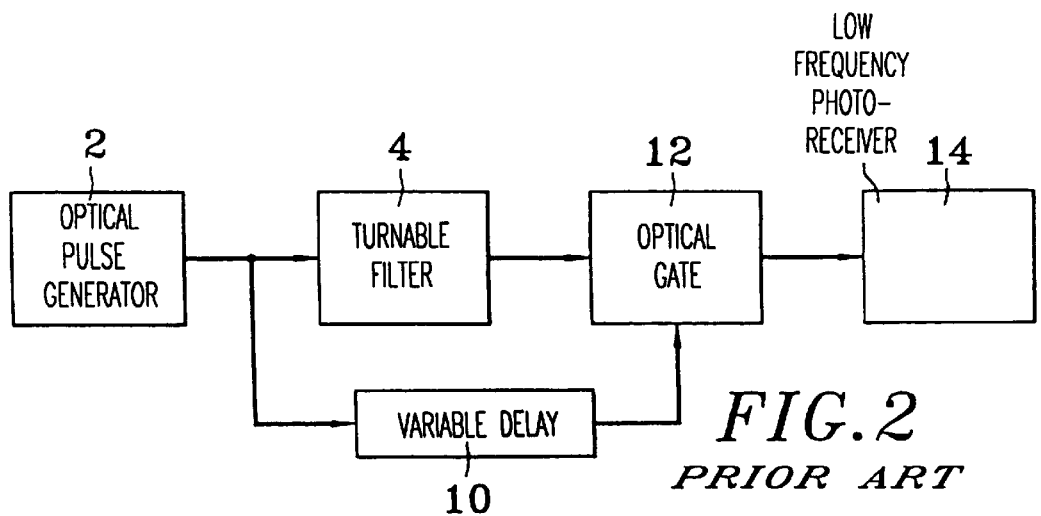
Figure 3:
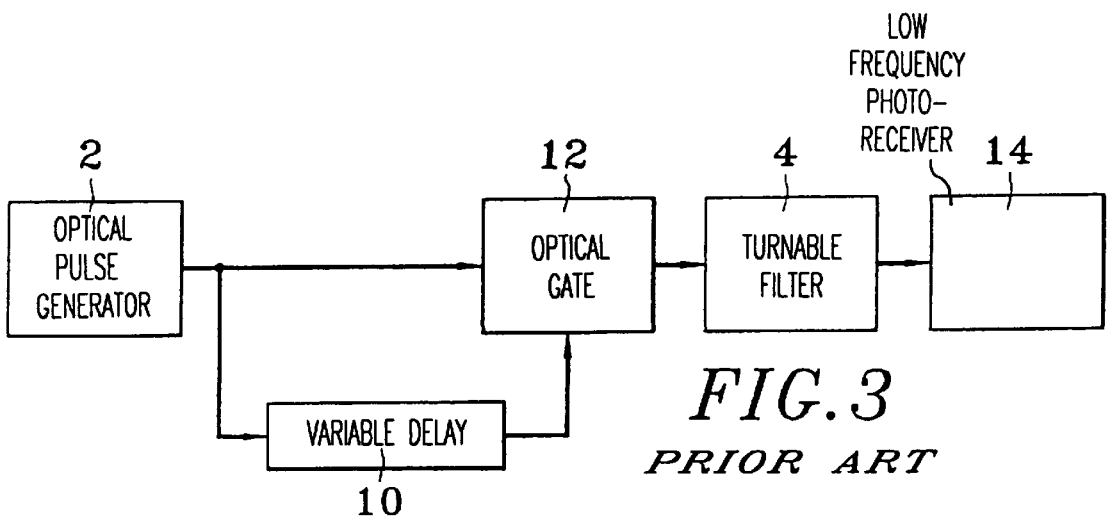

Referring now to the drawings, wherein like reference numerals designate identical or corresponding parts throughout the several views, and more particularly to FIGS. 4–11 thereof, there is illustrated exemplary embodiments of the present invention.

Figure 4:
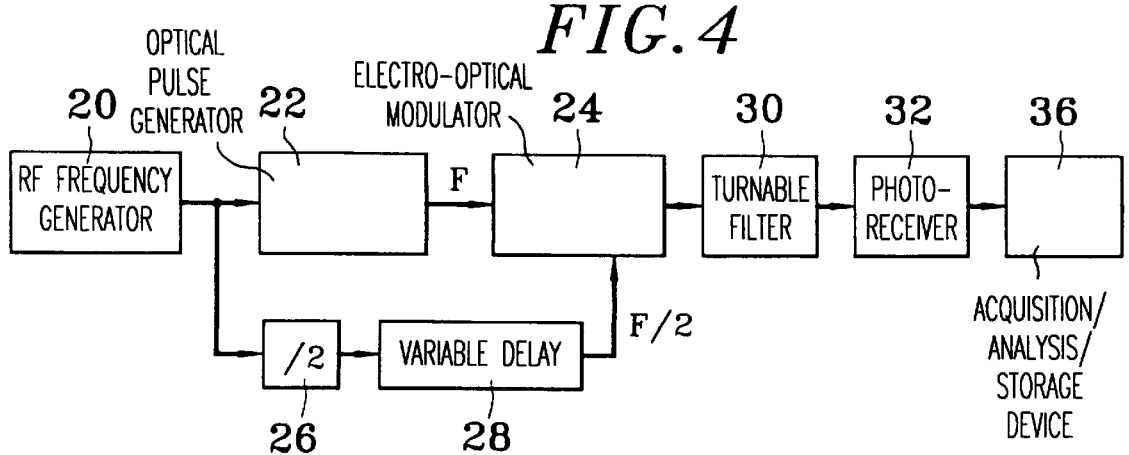
FIG. 4 shows an embodiment of a device according to the invention.

FIG. 4 shows a first embodiment of a device according to the invention, which is particular suitable for pulses to be measured with a periodic nature. For example, these pulses are generated at a frequency F by an RF frequency generator 20 that controls an optical pulse generator 22.

This frequency F can also possibly be obtained using a clock retrieval circuit, a signal taken from the output of the pulse generator being applied to the input of the clock circuit, particularly if it is difficult to access the pilot frequency F.

Figure 5:
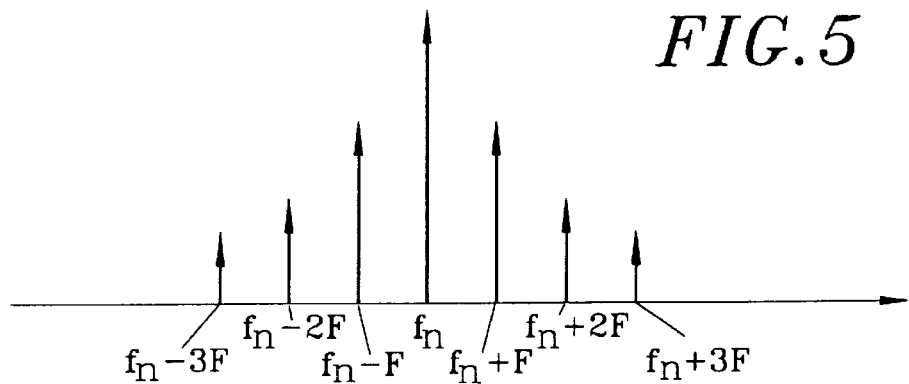
FIG. 5 shows a spectrum of spikes.

The pulse generator 22 produces a spectrum with spikes at frequency $f_n=f_0\pm nF$ (FIG. 5). The carrier is called the "order 0 spike", $f_0$, and spike order n is called the frequency $f_n$ spike.

Part of the power of the clock signal passes through a frequency divider by 2 (26), and then through a variable delay line 28 before being applied to the input of an electro-optical modulator 24. The optical signal output from the electro-optical modulator is analyzed by an optical spectrum analyzer, in this case consisting of a tunable filter 30 followed by a photoreceiver 32. A phase shifter can also be used, replacing the variable delay line. This phase shift can also be achieved using means placed at the output from the optical pulse generator 22 in order to create an optical delay.

For example, the electro-optical modulator 24 may be a Mach-Zehnder modulator. This type of modulator is described in the book by Irene and Michel JOINDOT: "Les télécommunications par fibres optiques—Telecommunications using optical fibers", pages 380–385, DUNOD, 1996.

Figure 6:
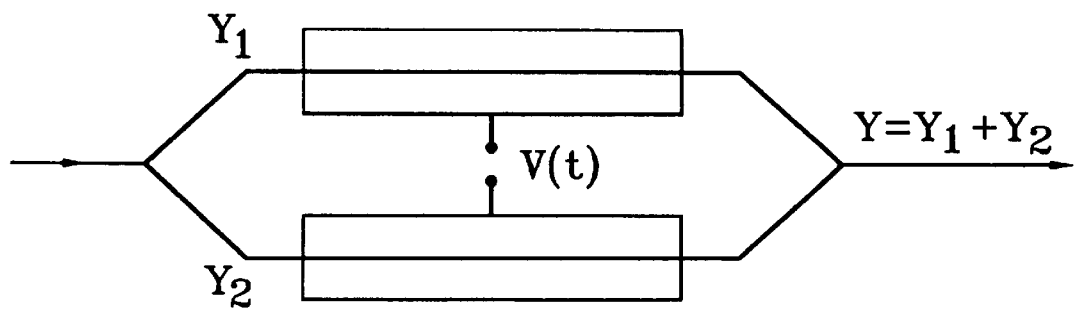
FIG. 6 is a block diagram showing a Mach-Zehnder type modulator.

FIG. 6 illustrates the operation of a Mach-Zehnder modulator. Starting from an input signal I, a signal or optical field $Y_1 = E_1 \cos(\omega t + \phi_1)$ is obtained in one branch of the modulator, and a signal or optical field $Y_2 = E_2 \cos(\omega t + \phi_2)$ is obtained in the other branch. The output signal is equal to the sum $Y_1 + Y_2$ of the signals in each branch.

In practice, the modulator is polarized at a point that cancels out the optical signal $Y = Y_1 + Y_2$ (at all frequencies $f_0 \pm nF$). This is done by inputting a phase difference $\pi$ between the two arms of the device.

Furthermore, a sinusoidal voltage at frequency $\Delta f$ is applied as the modulator control signal (FIG. 7B), the amplitude of this voltage being small compared with voltage $V\pi$ ($V\pi$ = the voltage that results in a 100% modulation rate). If the optical signal at the modulator input is a continuous signal with an optical frequency f (FIG. 7A), the output signal comprises two spikes with frequencies equal to $f - \Delta f$ and $f + \Delta f$ respectively, the carrier frequency f being eliminated (FIG. 7C).

Figure 8A:
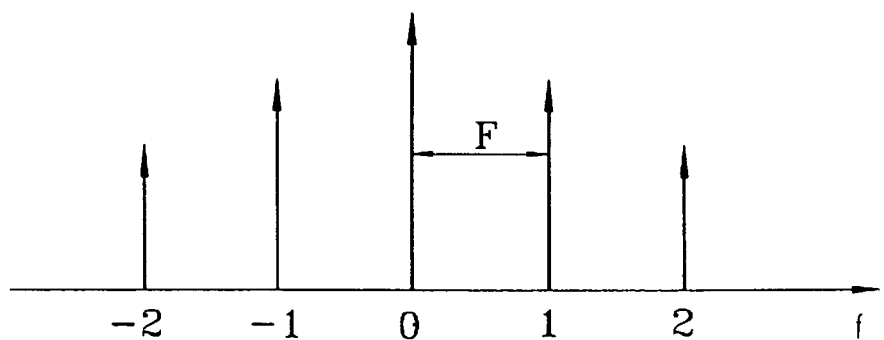
FIG. 8A shows an optical spectrum of the signal at the modulator input.
Figure 8B:
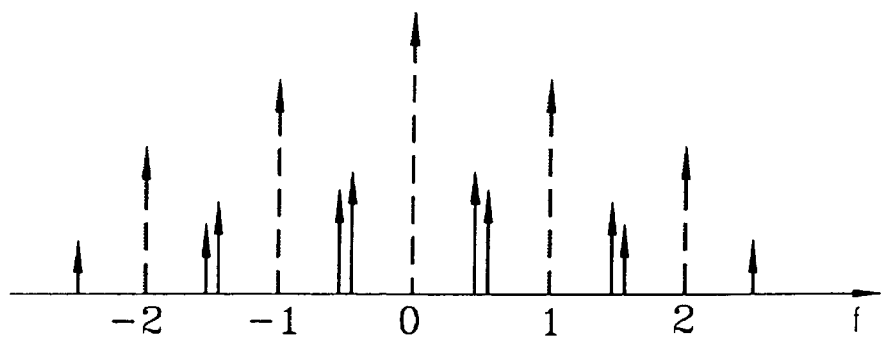
FIG. 8B shows an optical spectrum of the signal at the modulator output.

With the device described above, an optical spectrum of spikes present at the modulator input and with the shape illustrated in FIG. 8A, is transformed into another optical spectrum, the optical frequencies of the spikes in this spectrum being located at values $f_n = f_0 \pm (n + 0.5)F$, where n = the order of the spikes in the signal to be measured (FIG. 8B).

By modifying the delay $\tau$ of the delay line 28 (or as mentioned above, using a phase shifter or an optical delay at the output from generator 22), the phase of the sinusoidal signal with frequency F/2 can be varied with respect to the phase of the optical pulse stream at frequency F input to the electro-optical modulator. Thus, the intensity of spike orders n+0.5 varies sinusoidally as a function of $\tau$ (or the phase shift, or the optical delay), with a period $T = 1/F$ and a phase that corresponds to the optical phase difference between spike orders n and n+1. The phase of each spike can be determined from the phase difference between two adjacent spikes.

For example, the following procedure can be used.

Let $t_{n,n+1}$ = the delay indicated on the delay line, for which the two spikes n and n+1 are coincident at a particular and arbitrary point on the sine curve (this point may be the maximum or the minimum, or the passage through zero from a positive value, or the passage through zero from a negative value, etc.).

Let $t_0$ be a reference time such that:

$$t_0 = \frac{1}{2} x[t_{-1,0} + t_{0,1}] \quad (1)$$

And let $\phi_0$ be the reference phase:

$$\phi_0 = 0 (\phi_0 = \text{phase of the central spike: } n=0). \quad (2)$$

These choices are arbitrary, and they are made only to achieve symmetry about the most intense spike (order 0).

Thus, phase $\phi_n$ of the order n spike may be obtained using recurrence relations:

$$\phi_n = \Omega(t_0 - t_{n-1,n}) + \phi_{n-1} \text{ for } n > 0 \quad (3)$$

and $$\phi_n = \phi_{n+1} - \Omega(t_0 - t_{n,n+1}) \text{ for } n < 0 \quad (4)$$

where:

$$\Omega = 2\pi F \quad (5)$$

If a phase shifter is used instead of a delay line, the relation between the time t and the phase $\phi$ at frequency F is as follows:

$$\phi = 2\pi F t \quad (6)$$

Another way of proceeding is to record the intensity I of spikes n+0.5 as a function of the delay t of the delay line (or the phase of a phase shifter) and calculate the Fourier transform of I(t) so that the phase of harmonic 1 can be determined. The phase of each spike can then be determined using relations 1 to 6.

The phase of each spike, associated with a conventional measurement of the intensity spectrum, can be measured to give complete information about the electromagnetic signal formed by the optical pulse. For example, the inverse Fourier transform of the complex spectrum can be used to determine the profile of the optical pulse and the variation in the instantaneous optical frequency (chirp).

The device according to the invention is capable of converting each spike at frequency $f_n$ into two spikes at frequencies $f_n - F/2$ and $f_n + F/2$ (F=frequency that separates two adjacent spikes) at time $\tau$ imposed by the delay line 28. The two new spikes $f_n + F/2$ and $f_{n+1} - F/2$ are at the same frequency and may easily be isolated using a sufficiently narrow filter. If these two spikes are in phase, there is constructive interference and the resultant intensity I is maximum. I is minimum when these two spikes are in phase opposition. If $\tau$ (the conversion time) is varied, $I(\tau)$ is then a sinusoidal function in which the phase corresponds to the required phase. Note that the frequencies of all spikes are converted at the same time.

The device, or detection means 32, outputs signals representative of interferences at frequencies $f_n \pm F/2$. These signals may be processed and/or analyzed by any appropriate means to output data that may themselves be analyzed and/or memorized. Acquisition and/or analysis, and possibly memorization, means 36, may be provided for this purpose. For example, these means may include a conventional microcomputer which can be specially programmed for analysis and/or acquisition and/or memorization of data.

Similarly, or alternatively, means 36 (for example a microcomputer) may be provided to control or steer the process used applied using the device in FIG. 4.

In both cases, programming instructions for analysis and/or acquisition and/or memorization of data and/or control of the device are stored on conventional RAM or ROM drives.

We have seen above that the phases $\phi_1$ and $\phi_2$ of each branch of the electro-optical modulator can be varied by applying an external electric field. If the phase on only one of the arms is modulated (for example $\phi_1$), the optical frequency of the resulting field ($y=Y_1+Y_2$) is modified by the quantity $d\phi_1/dt$ (chirp) This chirp can be eliminated by modulating the two phases $\phi_1$ and $\phi_2$ such that $$\frac{d\varphi_1}{dt} = -\frac{d\varphi_2}{dt};$$

thus the optical frequency of $Y=Y_1+Y_2$ remains constant. Most commercial modulators only have one electrical input to modulate the optical signal. The electrodes at the terminals on which the modulation voltage is applied are then such that the electrical fields in the two arms have opposite signs and the same absolute value.

Preferably, the amplitude v of the sinusoidal voltage applied to the Mach-Zehnder modulator is small compared with $v\pi$ ($v\pi$=voltage that enables a modulation rate of 100%). If the amplitude v is too large then harmonic frequencies will be generated. Harmonic 2 is not annoying since it is located at frequencies of the order n (n=integer), in other words outside measurement frequencies (see FIG. 8B). On the other hand, harmonic 3 is located at frequencies of orders 0.5+n (n=integer) and can therefore disturb the measurement (see FIG. 8B). A simple calculation shows that the expression of the harmonic ratio 3 is $H_3=0.1\epsilon^2$, where $$\varepsilon = \frac{v}{v\pi} = \text{modulation ratio.}$$

This shows that the error generated by the "small signals" approximation is negligible, even for a modulation ratio as high as 30%.

Furthermore, it can be demonstrated that, still for a value of the modulation ratio $\epsilon$ less than 30%, the device is not very sensitive to an asymmetric optical phase modulation in the two arms of the modulator. Any asymmetric optical phase modulation will cause a parasite optical frequency modulation (chirp). The disadvantage of this parasite frequency modulation is that harmonic parasite spikes 3 are generated, and a simple calculation shows that the ratio between the value of these spikes and the harmonic 1 spikes is $$H_3 \approx 0.3\varepsilon^2 \frac{\Delta\varepsilon}{\varepsilon},$$

where $$\varepsilon = \frac{v}{V\pi} = \text{modulation ratio}$$

modulation ratio and $$\frac{\Delta\varepsilon}{\varepsilon} = \text{unbalance in the modulation ratio between the}$$

two arms of the Mach-Zehnder.

unbalance in the modulation ratio between the two arms of the Mach-Zehnder. If it is assumed that $\epsilon$ is small ($\epsilon<0.3$), $H_3$ is negligible even if $$\frac{\Delta\varepsilon}{\varepsilon}$$

is relatively large $$(\frac{\Delta\varepsilon}{\varepsilon}$$

is equal to not more than 1 when a single arm of the Mach-Zehnder is modulated).

Another advantage of the device according to the invention is that it provides some tolerance on the value of the polarization point.

Figure 7A:
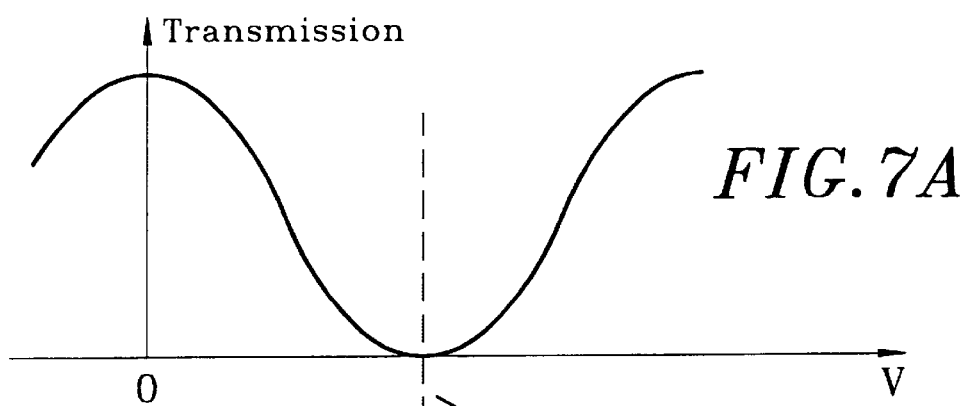
FIGS. 7A to 7C illustrate the operation of a Mach-Zehnder type modulator.
Figure 7B:
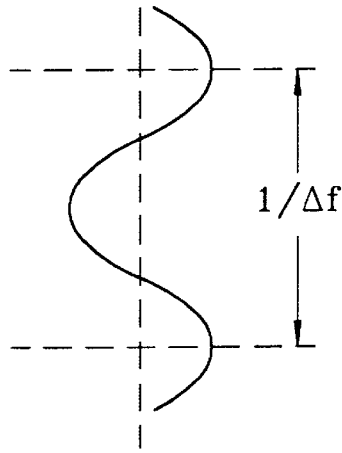
Figure 7C:
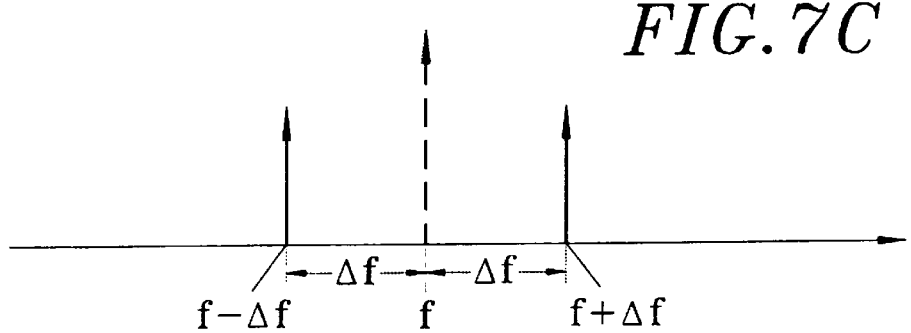

The modulator is preferably polarized at a point that switches off the optical signal (see FIGS. 7A and 7B). This is obtained by introducing a phase difference of $\pi$ between the two arms of the Mach-Zehnder. Let $\epsilon_p$ be the error at the polarization point with respect to $\pi$ expressed in radians. A simple calculation shows that the effect of this error is to generate parasite spikes at order n frequencies (where n is an integer), in other words outside measurement frequencies (see FIG. 6B) which are located at order n+0.5 frequencies (where n is an integer).

The conversion time $\tau$ from optical frequency $f_n$ to $f_n+F/2$ and $f_n-F/2$ may also be varied statically, without using a variable delay line or a variable phase shifter. This is done by replacing this variable delay line by a means that shifts the electrical frequency F/2 by a value $\Delta F$ that is very small compared with F, of the order of a few kHz (for example 2 kHz or 5 kHz). In this case, the frequency $F/2\pm\Delta F$ instead of F/2 is input into the electro-optical modulator. The intensity I(t) at order 0.5+n frequencies (where n is an integer) is then a sinusoidal function with frequency $2\Delta F$, and its phase is the phase difference between order n and n+1 spikes in the signal. This phase is easy to measure, since it is measured with respect to a frequency that may advantageously be fixed within the low frequencies domain (a few kHz).

For example, the electrical frequency F/2 can be translated towards frequency $F/2\pm\Delta F$ using a VCO (Voltage Control Oscillator) and a frequency discriminator centered on $\Delta F$.

According to another variant, a sinusoidal signal with frequency F is input to the electro-optical modulator. In this case, the optical frequency $f_n$ is converted into two frequencies $f_n-F$ and $f_n+F$. Thus, the transposed spikes $f_{n-1}$ and $f_{n+1}$, and a residue of the carrier $f_n$, are added to the optical frequency corresponding to order n. To the extent that it is impossible to eliminate it completely, it is then preferable to keep part of the carrier $f_n$ by polarizing the modulator with a phase difference of between $\pi$ and $\pi/2$, between the two arms of the Mach-Zehnder. Under these conditions, if the phase of the sinusoidal electrical signal with frequency F input to the modulator is varied with respect to the phase of the stream of optical pulses with frequency F passing through this modulator, by modifying the delay $\tau$ of the delay line 28 or by modifying the phase shifter, then the intensity I($\tau$) located at order n optical frequencies (n is an integer) varies periodically with a period T=1/F. By analyzing the periodic signal I($\tau$), particularly using a Fourier transform, it becomes possible to calculate phase differences between spikes n, n−1 and n+1, and thus to determine the phase of each spike.

This can be done considering three waves each characterized by its amplitude $a_i$ (i=1, 2, 3) and its phase $\phi_i$ (i=1, 2, 3). The sum of these three waves is then:

$$y=a_1e^{j\phi_1}+a_2e^{j\phi_2}+a_3e^{j\phi_3} \qquad (7)$$

and the resulting intensity is:

$$yy^* = a_1^2 + a_2^2 + a_3^2 + 2a_1a_2\cos(\phi_1-\phi_2) + 2a_2a_3\cos(\phi_2-\phi_3) + 2a_3a_1\cos(\phi_3-\phi_1) \quad (8)$$

Phases $\phi_i$ depend on the delay $\tau$ introduced by the delay line:

$$\phi_1 = \Phi_1 - \Omega_\tau, \ \phi_2 = \Phi_2, \ \phi_3 = \Phi_3 + \Omega_\tau \quad (9)$$

where $$\Omega = 2\pi F \quad (10)$$

Equation (8) then becomes:

$$I(\tau) = H_0 + H_1 + H_2 \quad (11)$$

where:

$$H_0 = a_1^2 + a_2^2 + a_3^2 \quad (12)$$

$$H_1 = 2a_1a_2\cos(\Phi_2 - \Phi_1 + \Omega_\tau) + 2a_2a_3\cos(\Phi_3 - \Phi_2 + \Omega_\tau) \quad (13)$$

$$H_2 = 2a_3a_1\cos(\Phi_3 - \Phi_2 + 2\Omega_\tau) \quad (14)$$

$H_0$ then represents the dc component of the F.T. (Fourier Transform) of $I(\tau)$. $H_1$ represents harmonic 1 of the F.T. of $I(\tau)$ and $H_2$ represents harmonic 2.

Let $\alpha_1$ = phase of $H_1$ and $\alpha_2$ = phase of $H_2$.
Then:

$$\Phi_3 - \Phi_1 = \alpha_2 \quad (15)$$

The harmonic $H_1$ is the sum of two vectors with modulus $2a_2a_1$ and $2a_2a_3$ respectively and with phases $\Phi_1 - \Phi_2$ and $\Phi_2 - \Phi_3$ respectively. The phase difference of these two vectors is equal to:

$$m = \Phi_3 + \Phi_1 - 2\Phi_2 \quad (16)$$

The intensities $a_1^2$, $a_2^2$ and $a_2^2$ are measured conventionally using a spectrum analyzer, so that the moduli $v_1$ and $v_2$ can be determined. The modulus of the resultant of the two vectors $v_1$ and $v_2$ is equal to the modulus of $H_1$, so that the angle $m$ of $v_1$ with $v_2$ can be determined (solution of a triangle knowing the three sides).

$$\cos m = -\frac{4a_1^2 + 4a_3^2 - |H_2|^2}{4a_1a_3}$$

Knowing $\alpha_2$, $m$ and $\Phi_1$, equations (15) and (16) are used to determine $\Phi_2$ and $\Phi_3$. By fixing a reference phase, for example $\Phi_0 = 0$ for the order 0 spike, the values of the phases of the other spikes are obtained, with the same redundancy.

With this variant, the means of converting a signal with a single spike f into a signal with the same spike plus two side spikes f–F and f+F (F<<f) may consist of any type of modulator, for example an electro-absorbent modulator or even a phase modulator. Examples of these modulators are described in "Physics of Optoelectronics Devices" pages 508 to 580, by Shun Lien Chuang, published by Wiley-Interscience Publication New-York.

The invention was described above for the case of a discrete spectrum.

The spectrum of a pulse stream repeated at frequency F is a spectrum of spikes, the envelope of which is the Fourier transform of an isolated pulse. The distance between two adjacent spikes is F. If F is reduced, the number of spikes increases and the intensity of each reduces. If F tends towards 0, the spectrum becomes a continuous spectrum and the intensity of the spikes is transformed into energy density. In practice, a continuous spectrum is observed on the spectrum analyzer when the repetition frequency F is much less than the resolution of the analyzer.

When the continuous spectrum is digitized, the sampling is done with a sufficiently fine pitch to keep all the information. In practice, the sampling step depends on the useful duration of the pulse. For example, a 10 ps wide pulse at mid-height for which all the energy is located within a 50 ps window, has a spectrum in which sampling is done at 1/0.05=20 GHz in order to keep all the information. Knowing the minimum sampling pitch, the phase difference between two adjacent samples is then measured. This is done using the device shown in FIG. 9. Reference 42 in this figure represents an optical pulse generator. Output pulses are input into an electro-optical modulator 44, for example a Mach-Zehnder modulator (with the same advantages as described above). Some of the optical power is sent to a photoreceiver 46 that initiates an RF generator 48 locked in phase. This RF generator generates a sinusoidal voltage, the frequency F of which depends on the spectrum sampling pitch, and which is applied to modulator 44 through a line 50 with a variable delay $\tau$. A tunable optical filter 52, together with a photodetector 54, forms an optical spectrum analyzer. The optical intensity at the output from filter 52 at optical frequency f is a sinusoidal function with delay $\tau$, where $I(\tau) = S(f-F) + S(f+F)$. The phase of this sine curve corresponds to the phase difference $S(f)$ between frequencies f–F and f+F. If f is varied by 2F, the phase of all spectrum samples at a spacing of 2F is determined, as in the case of a spectrum of spikes.

The RF generator 48, locked in phase with the pulse to be measured, may consist of a simple narrow pass band filter centered on F.

Figure 9:
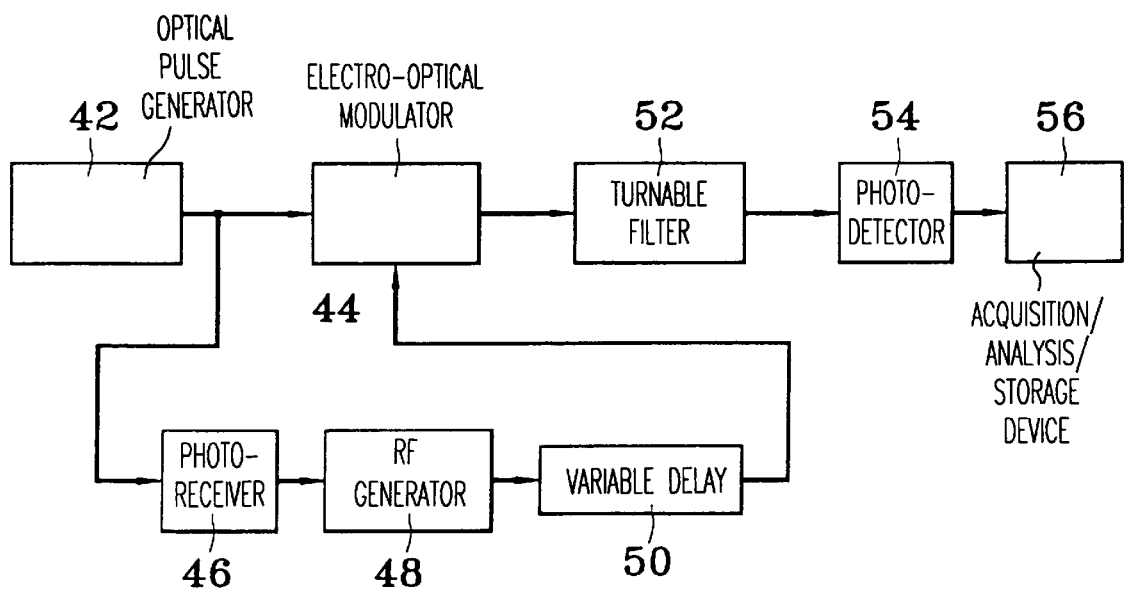
FIG. 9 shows an embodiment of an experimental device according to the invention, for measuring a continuous optical spectrum.

Finally, reference 56 denotes acquisition and/or analysis, and possibly memorization means for data or signals produced by photoreceiver 54, and/or means of controlling the device in FIG. 9. These means 56 are equivalent to means 36 already described above with relation to FIG. 4.

We will now describe an application concerning the measurement of the chirp of an optical emitter.

The variation in light intensity output from an optical emitter is accompanied by a variation in the frequency of the optical carrier (chirp). Chirp is a phenomenon that influences the optical transmission, and therefore it is important to measure it.

Chirp is characterized by the $\alpha$ parameter defined by the relation $$\alpha = 2I\frac{\Delta\Phi}{\Delta I}$$

where I=optical intensity and $\Delta\Phi$=variation of the optical phase generated by the variation in intensity $\Delta I$.

$\alpha$ is measured by slightly and sinusoidaly modulating the intensity I at frequency F. The optical emitter then outputs three optical spikes, namely the carrier $A_0$ and the two side spikes $A_{-1}$ and $A_{+1}$. The phase relation between these spikes is then measured, for example using the device in FIG. 4, the optical emitter being used instead of the pulse generator 22. In this case, a simple calculation gives $\alpha = \tan[(\tau_1-\tau_2)\pi F]$, where:

$\tau_1$ is the position of the delay line for which the intensity $I(\tau)$ at the –0.5 order frequency (order between –1 and 0) is a minimum (or maximum), $\tau_2$ is the position of the delay line at which the intensity $I(\tau)$ at the +0.5 order frequency is a minimum (or maximum), F is the modulation frequency applied to the emitter, $I(\tau)$ is the intensity measured at the spectrum analyzer.

Figure 10:
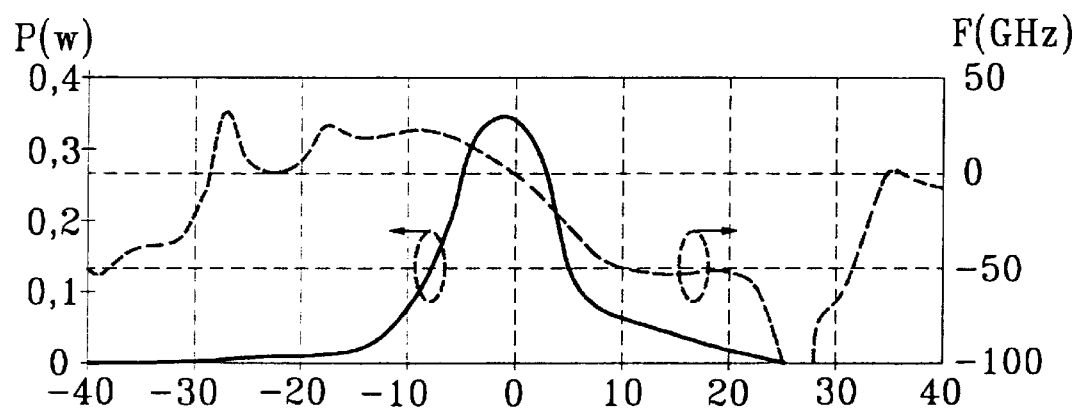
FIG. 10 illustrates the result of the measurement of the intensity I(t) and the instantaneous frequency of a pulse, using a process according to the invention.
Figure 11:
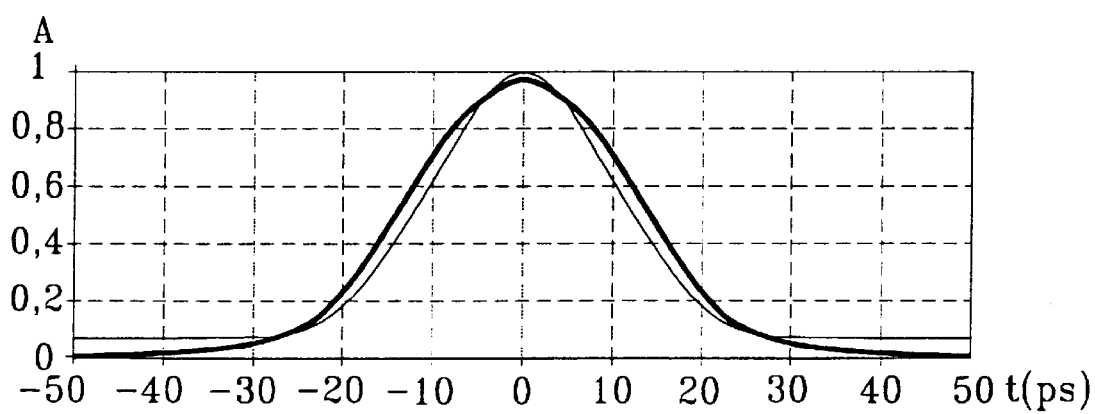
FIG. 11 shows a comparison between the self-correlation function of an optical signal, measured according to the invention, and the value measured in the conventional manner by a self-correlator.

FIGS. 10 and 11 show the results of an example measurement output from an optical pulse generator consisting of a laser operating in gain switching.

The curve shown in solid lines in FIG. 10 represents the power P of the pulse (in watts) as a function of time. This intensity I(t) is calculated making use of the measurement, according to the invention, of the complex spectrum V(f). In fact, I(t)=v(t)v(t)* where v(t)=F.T.$^{-1}$[V(f)] (F.T.$^{-1}$=inverse Fourier transform).

This same figure shows a curve in dashed lines representing the variation in the instantaneous frequency F (in GHz) of the optical carrier as a function of time (chirp)–f$_i$(t). This frequency variation is deduced from V(f), and is measured by the relation $$f_i(t) = \frac{1}{2\pi} \times \frac{d\theta(t)}{dt},$$

where θ(t)=argument of v(t) and v(t)=F.T.$^{-1}$[V(f)].

The self-correlation function can also be calculated depending on the measured V(f) (FIG. 11, thin line), and can be compared in a conventional manner to the value measured by a self-correlator (FIG. 11, thick line). Good agreement is obtained between the two measurement results, due to the measurement uncertainty of the self-correlator. In FIG. 11, A shows the normalized amplitude of the self-correlation function, as a function of time t (in ps).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for determining a phase relation of a signal having a spectrum including a spectral component at a central optical frequency f$_0$ and spikes at frequencies f$_n$=f$_0$±nF, where n is an integer and F is a predetermined frequency, the device comprising:

a modulator adapted to receive the signal;

a frequency divider adapted to receive a signal of the predetermined frequency;

a variable delay coupled between the frequency divider and the modulator;

a tunable filter coupled to the modulator; and a photoreceiver coupled to the tunable filter, wherein the device produces signals representative of phase differences between two spikes in pairs of adjacent spikes of the spikes at the frequencies f$_n$=f$_0$±nF.

2. The device of claim 1, further comprising:

processor device adapted to produce a signal representative of a phase of each spike based on the signals representative of the phase differences.

3. The device of claims 1 or 2, wherein the modulator, the frequency divider and the variable delay are adapted to convert two spikes, f$_n$ and f$_{n+1}$, into two spikes having frequencies f$_n$+0.5F, and the tunable filter and the photoreceiver are adapted to produce a signal representative of a phase of an interference signal between the two spikes having frequencies f$_n$+0.5F.

4. The device of claim 3, wherein the modulator and the frequency divider are adapted to modulate the signal to be measured with a signal of frequency F/2, and the variable delay is adapted to shift a phase of the signal at frequency F/2 with respect to a spectrum to be measured.

5. The device of claim 4, wherein the variable delay comprises one of a variable delay line and a variable phase shifter.

6. The device of claim 1, wherein the variable delay comprises a frequency device adapted to produce signals representative of a phase differences between two spikes, f$_n$ and f$_{n+1}$, by converting the two spikes into two spikes with frequency f$_n$±0.5F±ΔF, where ΔF/F<<1, and produce a signal representative of an intensity at frequency f$_n$+0.5F.

7. The device of claim 6, wherein the frequency device comprises a voltage controlled oscillator and a frequency discriminator.

8. The device of claim 4, wherein the modulator comprises an electro-optical modulator.

9. The device of claim 8, wherein the electro-optical modulator comprises a Mach-Zehnder electro-optical modulator.

10. The device of claim 8, wherein the electro-optical modulator is polarized so as to cancel an optical signal at an output thereof.

11. The device of claim 1, wherein the variable delay comprises a frequency device adapted to produce signals representative of phase differences between two spikes, f$_n$ and f$_{n+1}$, by converting each spike, f$_n$, into two spikes at frequencies f$_n$–F and f$_n$+F, and produce a signal representative of a phase of an interference signal between the spikes f$_n$.

12. The device of claim 11, wherein the frequency device comprises:

a modulator for modulating a signal to be measured with a signal with the frequency F, and a shifter for shifting a phase of the signal with the frequency F with respect to the signal to be measured.

13. The device of claims 11 or 12, wherein the frequency device comprises one of an electro-absorbent modulator and a phase modulator.

14. A device for determining a phase relation of an optical signal having a continuous spectrum, comprising:

a modulator adapted to receive the optical signal;

a photoreceiver adapted to receive the optical signal;

a signal generator coupled to the photoreceiver and adapted to generate a signal having a frequency F dependent on a spectrum sampling frequency;

a variable delay coupled between the signal generator and the modulator a tunable filter coupled to the modulator; and a photodetector coupled to the tunable filter, wherein the device produces signals representative of a phase difference between a signal having frequency f$_n$–F and a signal having a frequency f$_n$+F for n sampling frequencies f$_n$, and the frequency F is one half of the spectrum sampling frequency.

15. The device of claim 14, further comprising:

processor device adapted to produce a signal representative of the signal phase for each frequency f$_0$±nF based on the signals representative of the phase differences.

16. The device of claims 14 or 15, wherein the modulator, the photoreceiver and the signal generator are adapted to modulate the signal with a continuous spectrum at the frequency F, and the tunable filter and the photodetector are adapted to produce a signal representative of a sum of intensities of the optical signal at frequencies f$_n$–F and f$_n$+F, for each sampling frequency f$_n$.

17. The device of claim 16, wherein the modulator comprises an electro-optical modulator.

18. The device of claim 17, wherein the electro-optical modulator comprises a Mach-Zehnder electro-optical modulator.

19. The device of claim 17, wherein the electro-optical modulator is polarized so as to cancel an optical signal at an output thereof.

20. The device of claim 16, wherein the tunable filter comprises a tunable optical filter.

21. The device of claim 16, wherein the variable delay comprises one of a variable delay line and a variable phase shifter.

* * * * *